(12) United States Patent
Moran

(10) Patent No.: US 7,706,478 B2
(45) Date of Patent: Apr. 27, 2010

(54) METHOD AND APPARATUS OF SOURCE SEPARATION

(75) Inventor: John E. Moran, Dearborn, MI (US)

(73) Assignee: SignalSpace, Inc., Cincinnati, OH (US)

( * ) Notice: Subject to any disclaimer, the term of this patent is extended or adjusted under 35 U.S.C. 154(b) by 1050 days.

(21) Appl. No.: 11/373,325

(22) Filed: Mar. 13, 2006

(65) Prior Publication Data

US 2006/0262865 A1 Nov. 23, 2006

Related U.S. Application Data

(60) Provisional application No. 60/682,404, filed on May 19, 2005.

(51) Int. Cl.
*H04L 27/06* (2006.01)
(52) U.S. Cl. ...................................... 375/340
(58) Field of Classification Search ................. 375/316, 375/340, 377
See application file for complete search history.

(56) References Cited

U.S. PATENT DOCUMENTS

| | | | | | |
|---|---|---|---|---|---|
| 5,357,544 | A | * | 10/1994 | Horner et al. | ................ 375/340 |
| 5,917,919 | A | | 6/1999 | Rosenthal | |
| 7,065,144 | B2 | | 6/2006 | Walton et al. | |
| 2002/0136328 | A1 | * | 9/2002 | Shimizu | ..................... 375/316 |
| 2004/0260522 | A1 | * | 12/2004 | Albera et al. | ................ 702/189 |

OTHER PUBLICATIONS

Aapo Hyvärinen, "Survey on Independent Component Analysis", Helsinki University of Technology, Laboratory of Computer and Information Science, http://www.cis.hut.fi/~aapo/, pp. 1-35.
Peter R. Johnston et al., "Selecting the Corner in the L-Curve Approach to Tikhonov Regularization", IEEE Transactions on Biomedical Engineering, vol. 47, No. 9, Sep. 2000, pp. 1293-1296.
Lang Tong et al., "Indeterminacy and Identifiability of Blind Identification", IEEE Transactions on Circuits and Systems, vol. 38, No. 5, May 1991, pp. 499-509.
Seungjin Choi et al., "Blind Separation of Second-Order Nonstationary and Termpolly Colored Sources", 4 pgs.
Dinh-Tuan Pham et al., "Blind Separation of Instantaneous Mixtures of Nonstationary Sources", IEEE Transactions on Signal Processing, vol. 49, No. 9, Sep. 2001, pp. 1837-1848.
Jean-François Cardoso, "High-Order Contrasts for Independent Component Analysis", Letter communicated by Anthony Bell, pp. 158-192.

(Continued)

*Primary Examiner*—Tesfaldet Bocure
(74) *Attorney, Agent, or Firm*—MH2 Technology Law Group

(57) ABSTRACT

An embodiment generally relates to a method of signal discrimination. The method includes receiving plurality of signal mixtures, where each signal has a property whose value is based on a principal eigenvalue of a unique separating operator. The method also includes creating a separating operator using a target signal approximation and applying a separating operator for a target signal to the plurality of signal mixtures. The method further includes obtaining the target signal based on an operation of optimization of the separating operator for maximum property value amplitude on the plurality of signal mixtures.

29 Claims, 5 Drawing Sheets

OTHER PUBLICATIONS

Pierre Comon, "Contrasts for Multichannel Blind Deconvolution", IEEE Signal Processing Letters, vol. 3, No. 7, Jul. 1996, pp. 209-211.

Nathalie Delfosse et al., "Adaptive Separation of Independent Sources: A Deflation Approach", 1994, IEEE, pp. IV-41 to IV-44.

Constantinos B. Papadias, "Globally Convergent Blind Source Separation Based on a Multiuser Kurtosis Maximization Criterion", IEEE Transactions on Signal Processing, vol. 48, No. 12, Dec. 2000, pp. 3508-3519.

Jean-François Cardoso, "Blind Signal Separation: Statistical Principles", Proceedings of the IEEE, vol. 86, No. 10, Oct. 1998, pp. 2009-2025.

Aapo Hyvärinen et al., "Independent Component Analysis: Algorithms and Applications", Neural Networks Research Centre, Helsinki University of Technology, Neural Networks 13(4-5): 411-430, 2000, pp. 1-31.

Jean-François Cardoso et al., "Blind Beamforming for Non Gaussain", Reprint from: IEEE- Proceedings-F, vol. 140, No. 6, pp. 362-370, Dec. 1993', pp. 1-17.

Tobias Blaschke et al., "CuBICA: Independent Componenet Analysis by Simultaneous Third- and Fourth-Order Cumulant Diagonalization", IEEE Transactions on Signal Processing, vol. 52, No. 5, May 2004, pp. 1250-1256.

Aapo Hyvärinen, "Fast and Robust Fixed-Point Algorithms for Independent Componen Analysis", IEEE Transaction on Neual Networks, vol. 10, No. 3, May 1999, pp. 626-634.

Jean-François Cardoso, "Source Separation using Higher Order Moments", 1989, IEEE, pp. 2109-2112.

\* cited by examiner

METHOD AND APPARATUS OF SOURCE SEPARATION

CROSS REFERENCE TO RELATED APPLICATION

This application claims priority from provisional application "Method And Apparatus For A Signal Source Operator To Source Separation", Application Ser. No. 60/682,404, filed May 19, 2005, and incorporated herein in its entirety by reference.

FIELD

This invention relates generally to processing data. More particularly, embodiments relate to a signal space operator approach to source separation.

DESCRIPTION OF THE RELATED ART

A classic problem in signal processing, often referred to as blind source separation (BSS), involves recovering individual source signals from a composite signal comprising a mixture of those individual signals. An example is the familiar "cocktail party" effect, where a person at a party is able to separate a single voice from the combination of all voices in the room. The separation is referred to as "blind" because it is often performed with limited information about the signals and the sources of the signals.

Several techniques have been proposed to solve the BSS problem. These can be classified into two main groups. The first being based on second-order statistics, and the second being based on higher-order statistics, such as those based on independent components analysis (ICA) and other higher-order spectral estimation and spatial filtering techniques. Recently, blind source separation by ICA has received attention because of its potential signal processing applications, such as speech enhancement, image processing, telecommunications, and medical signal processing, among others.

ICA may be considered a methodology for extracting statistically independent signals from multivariate data. In contrast to correlation-based transformations such as principal component analysis (PCA), ICA techniques utilize both second- and higher-order statistics of the data. Utilizing various measures of statistical independence, ICA techniques attempt to extract signals that are as statistically independent as possible. Typically, a recursive mathematical algorithm is used to construct a separation matrix which is applied to the data matrix to obtain the separated signals. ICA source separation is classified as "blind" because signals are observed only as an unknown mixture of signals from single or multiple sensors. ICA has proven a useful tool for finding structure in data, and has been successfully applied to processing real world data, including separating mixed speech signals and removing artifacts from EEG recordings.

In the following description, vectors and are denoted using lowercase bold text, $x_i$. All these vectors are column vectors. Matrices are denoted using uppercase bold text, X. Data, X, and signal, S, matrices are composed of row vectors. Singular value decomposition matrices, U and V, are composed of column vectors. A property operator matrix, such as $D_S$, includes a subscript that corresponds to the signal vector, s, from which it was constructed by the property operator. The matrix, diag(v), is a square matrix with the elements of the vector v on the diagonal and all other elements equal to zero. Double subscripted vectors, such as $p_{ss}$, consists of element-by-element component products of two vectors, $p_{ss}(t_j)=s(t_j)s(t_j)$. For subscripts, (i, j, k), double subscripted vectors, $p_{ik}$, consists of element-by-element component products, $p_{ik}(t_j)=v_i(t_j)v_k(t_j)$, where the vectors, $v_i$ and $v_k$ are basis vectors of the signal subspace, V. The notation, $p_{ii} \cdot p_{kk}$, is the vector dot-product between vectors $p_{ii}$ and $p_{kk}$ and is composed of a sum of fourth order products, $[v_i(t_j)v_i(t_j)v_k(t_j)v_k(t_j)]$. Vectors denoted with the letters, s, v, and u are normalized such that $s \cdot s = s_i \cdot s_i = v \cdot v = v_i \cdot v_i = u \cdot u = u_i \cdot u_i = 1$.

As general background, in a typical remote sensing application, each data channel of a sensor array receives an unknown mixture of signals. The mathematical relationship between the signals from individual sources and the respective measurements of signals from the individual sources may be described by a mixing equation. A noise free representation of the mixing equation is:

$$X = AS \quad \text{(Mixing Equation)} \quad (1)$$

with $X = [x_1, \ldots, x_j, \ldots, x_M]^T$, M sensors $x_j = [x_j(t_1), \ldots, x_j(t_K)]^T$ (sensor vector)

$S = [s_1, \ldots, s_N]^T$, N sources $s_i = [s_i(t_1), \ldots, s_i(t_K)]^T$ (source signal vector)

$s_i^T s_i = 1$ (normalized amplitudes)

A is an unknown M by N signal mixing matrix, M>N

Solving for the signals, S, is a blind separation problem because the mixing matrix, A, is unknown.

The signals, S, are normalized by incorporating the relative signal amplitudes in the mixing matrix, A. In addition, many techniques require that the signals are orthogonal, such that $SS^T = I$, (second order independence). Multiplication of Equation 1 by a whitening matrix, W, eliminates the unknown source amplitude dependence. This transformation allows the orthogonal source signals, S, to be obtained by applying an orthonormal unmixing matrix, $U_S^T$, to the whitened data, $V^T = WX$.

$$S = U_S^T V^T = U_S^T WX = U_S^T WAS \quad (2)$$

When the data contains noise, it is always useful and often necessary to eliminate excessive noise. Very often noise and signals are not correlated and have significantly different amplitudes, such that separation can be achieved using a singular value decomposition of the data and an appropriate model order selection technique.

$$X = [U, U_{Noise}] \begin{pmatrix} \lambda & 0 \\ 0 & \lambda_{Noise} \end{pmatrix} [V, V_{Noise}]^T = \begin{pmatrix} X_{signal} \\ X_{noise} \end{pmatrix} \quad (3)$$

The signal eigenvectors, $V^T$, in equation 3 are used as whitened data in Equation 2. For a large sensor array this decomposition attenuates noise and reduces the data dimensions to that of the signals with very minor signal power loss. In Equation 2, the unmixing matrix, $U_S^T$, must be still be determined.

While the mixing process is unknown, the signals, S, can be determined if a sufficiently large data set is available and the sources have the following statistical properties: (1) sources are mutually independent and activity is identically distributed across time; (2) no more than one source has normally distributed signal amplitudes; and (3) the number of sensors is greater than or equal to the number of sources.

Sources are mutually independent if the joint probability density function of signal amplitudes can be factored as a product of the individual source probability distributions. The time index can be ignored for sources that are identically distributed across time, (stationary process). A large variety of Independent Component Analysis (ICA) techniques have been developed which optimize some statistical measure of independence to obtain an estimate of signals from sources that are hypothesized to have these three properties. A few techniques allow temporal correlations and/or utilize non-stationary source properties for separation.

In general, ICA techniques construct an estimate, $U_E$, of the unmixing matrix, $U_S$, by minimizing a contrast function that incorporates the desired statistical constraints. Second order independence, ($V^T V = I$), is insufficient to achieve source separation unless the rows of the mixing matrix, A, are orthogonal and all sources, S, have different amplitudes. Fourth order independent component techniques utilize a contrast function that consists of sums of fourth order cumulants, $Cum(v_i, v_j, v_k, v_l)$, which are estimated, (for unit amplitude normalized vectors), from the data using:

$$Cum(v_i, v_j, v_k, v_l) \approx p_{ij} \cdot p_{kl} - (v_i \cdot v_j)(v_k \cdot v_l) - (v_i \cdot v_k)(v_j \cdot v_l) - (v_i \cdot v_l)(v_j \cdot v_k) \quad (4)$$

When the indexes are identical, $Cum(v_i, v_i, v_i, v_i)$ is the kurtosis of the density distribution of $v_i$. In general, fourth order techniques maximize kurtosis of the independent components. In addition, to kurtosis maximization, strict second order independence, ($V^T V = I$), is maintained by the fourth order technique, JADE, as well as the combined third and fourth order technique CuBICA. The second order terms in equation 4, are constants with respect to any orthonormal transformation that generates an estimate of the separated signals from the signal space basis vectors, $S_E = U_E V$. Therefore, optimization of JADE contrast functions alter only the fourth order products, $P_{ijkl} = p_{ij} \cdot p_{kl}$ in Equation 4. The importance of the fourth order products is similar for CuBICA.

However, ICA techniques still contain drawbacks and disadvantages. For example, ICA techniques require that the sources for the signals to be statistically independent. Moreover, the sources of the signals typically have unknown statistics and behaviors that are both non-stationary and mutually dependent. Accordingly, it is difficult to understand how ICA techniques enforcing statistical independence generate useful estimates of individual source activity. Further, ICA components appear to be extracted without obvious order because statistical independence used for separation is not useful for classifying the components.

SUMMARY

Embodiments of Signal Space Operator Module

An embodiment generally relates to a method of signal discrimination. The method includes receiving plurality of signal mixtures, where each signal has a property whose value is based on a principal eigenvalue of a unique separating operator. The method also includes creating a separating operator using a target signal approximation and applying a separating operator for a target signal to the plurality of signal mixtures. The method further includes obtaining the target signal based on an operation of the separating operator on the plurality of signal mixtures.

Another embodiment generally pertains to a computer readable storage medium on which is embedded one or more computer programs. The one or more computer programs implement a method of signal discrimination. The one or more computer programs include a set of instructions for receiving plurality of signal mixtures, each signal having a property whose value is based on a principal eigenvalue of a unique separating operator and creating a separating operator using a target signal approximation. The set of instructions also include applying a separating operator for the target signal to the plurality of signal mixtures and obtaining the target signal based on an operation of the separating operator on the plurality of signal mixtures.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
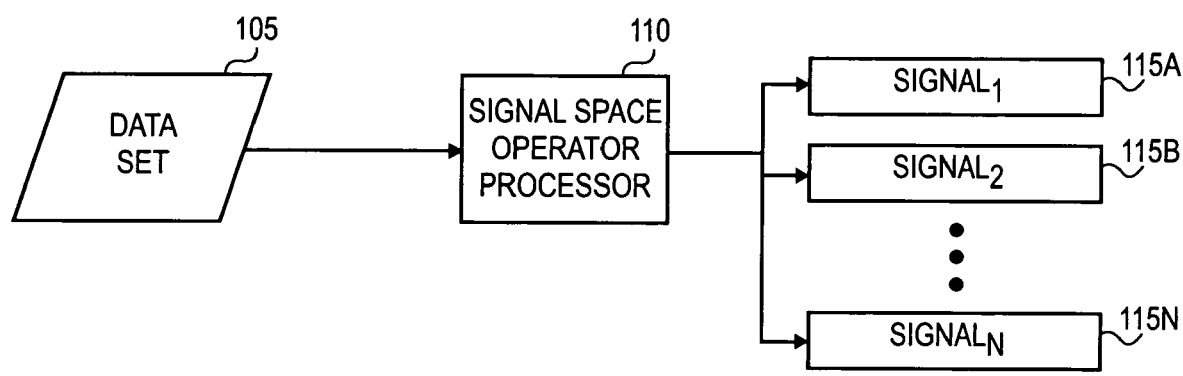
FIG. 1 illustrates a block diagram of an exemplary system where an embodiment may be practiced.

For simplicity and illustrative purposes, the principles of the present invention are described by referring mainly to exemplary embodiments thereof. However, one of ordinary skill in the art would readily recognize that the same principles are equally applicable to, and can be implemented in, all types of systems that generate signals, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments generally relate to system and method for source separation on signal mixtures. More particularly, a signal space operator ("SSO") module may be configured to separate the sources of a signal mixture, which may comprise multiple signal sources. In some embodiments, the SSO module may use the existence of an appropriate signal property operator whose restrictions to a subspace of the data generates a matrix with one or more of the desired signals as eigenvectors. In contrast to ICA techniques, some operational source properties are often better known that statistical properties. Moreover, measured amplitudes of the signal separation often provide insight to the operational or physical nature of the sources, as well as means to discriminate between the source and noise.

Accordingly, the inability to easily interpret statistical source separation results is a driver to develop a different strategy for source separation. Rather, than statistical independence, an embodiment of the source separation technique relies on the existence of an appropriate signal dependent property operator matrix, $F_S$, whose restriction to a signal subspace of the data has one or more of the desired signals as eigenvectors. Thus, signals are obtained without the need to create a separation matrix.

Embodiments of the SSO module, which embody the source separation technique may be premised on the following interpretation of source signals, the relationship between separating operators and measurement of source properties:

(1A) Let S={s:s has property F} denote the set of signal vectors, s, that have the property F. Further, for property F, there exists a signal mapping operator, {F(s)→$F_S$, s in S}, which generates a property operator matrix, $F_S$, such that the vector product, $f_S$=s•[$F_S$s] is the value of the property F of the signal, s. The restriction of this operator matrix is to a signal subspace spanned by the basis vector, V=[$v_1, v_2, \ldots, v_n$] is an operator matrix [$VV^TF_SVV^T$], where the vector product, s•[$VV^TF_SVV^T$]s is equal to $f_S$=s•[$F_S$s] provided the signal s is contained in the signal subspace, V; (2A) a property operator, $F_S$, is a separating operator within a signal subspace if the signal vector, s, is an eigenvector of the matrix $V^TF_SV$. The operator, $F_S$, is a principal separating operator when s is the eigenvector corresponding to the maximum eigenvalue, $\lambda_{max}$, ($F_S$s=$\lambda_{max}$s). Based on these principles, two optimization algorithms for property operators are described. These algorithms create a sequence of principal separation operators and corresponding separated signals.

Moreover, some embodiments use an approximate signal artifact to construct a principal separating operator matrix for the corresponding artifact contained in a signal mixture. Also, other embodiments may construct a power density operator matrix, $D_S$, a power rate operator, $H_S$, and an auto-correlation operator, $C_S$, which are used in embodiments of the invention for source separation. These operators exploit fourth order products between signals rather than second order correlations. For the signal power density operator, $D_S$, the SSO module algorithms used in the embodiments, which are recursive, are proven to always converge, and extract the signals with the greatest power density. However, the SSO module algorithms are applicable to other signal properties, F, with signal mapping operators, {F(s)→$F_S$, s in S} that do not involve fourth order products.

One aspect of the embodiments of the SSO module may be considered constructing principal separation operators from power density operators, which incorporate fourth-order signal properties. More particularly, the power density operator measures the relative ratio of total signal activity (power) to the length of time during which the source of the signal is actually active. For a signal, s, the power density operator constructs the diagonal operator matrix, $D_S$=diag($p_{SS}$), where the vector, $p_{ss}$ has elements of the signal amplitude squared, $s(t_j)s(t_j)$, with j=1, ..., K, on the diagonal of the matrix and zeros otherwise. Therefore, the signal, s, has a power density amplitude of $P_{ssss}$=s•[$D_S$s]=$p_{ss}$•$p_{ss}$ for source activity occurring during the measurement interval. This relationship is easy to demonstrate for any signal, s, normalized to have a total signal activity of 1(s•s=1) for the measurement interval and with uniform activity at only k time points:

$$s = \begin{bmatrix} s(t_j) = +\frac{1}{\sqrt{k}} \text{ or } -\frac{1}{\sqrt{k}} \\ s(t_j) = 0, \text{ otherwise} \\ [t_j \in k \text{ of } K \text{ sample times}] \end{bmatrix} \quad (5)$$

Therefore, the power density is $P_{ssss}$ is the sum of fourth order products, $$P_{ssss} = p_{ss} \cdot p_{ss} = \sum_{j=1}^{K}[s(t_j)]^4 = k\left(\frac{1}{k}\right)^2 = \frac{1}{k} \quad (6)$$

This equation shows that the power density is equal to the total source power divided by the cumulative interval of source activity, which has limits, $1/K \leq P_{ssss} \leq 1$ for any normalized signals. This can be proved by considering any sequence of pair-wise changes of these uniform signal amplitudes to obtain other signals. Fourth order products for two signals, $P_{iijj}$=$p_{ii}$•$p_{jj}$, quantifies signal cross-power density associated with simultaneous source activity. Sources are not simultaneously active if $P_{iijj}$=$p_{ii}$•$p_{jj}$=0. Further, the restriction of this operator to the subspace, V, of the plurality of signal mixtures is a matrix with fourth order products, $p_{ss}$•$p_{jk}$, where vectors, $p_{jk}$, have elements, $v_j(t_j)v_k(t_j)$. Source separation with this operator is especially useful for separating sources with burst behavior where the corresponding signal eigenvalues, $\lambda_{max}$, quantify signal power density, which can often be used to identify the sources of the signals.

The rate at which signals turn on/off and fluctuate in power is another signal property that can be useful for signal separation. The power rate operator is related to the time derivative of the power density vector, $$r = \frac{d}{dt}(p_{ss}) = 2\left[s(t_1)\frac{d}{dt}(s(t_10), \cdots, s(t_K)\frac{d}{dt}(s(t_K))\right]^T.$$

However, differentiation accentuates high frequency sensitivity to noise. Therefore, differentiation is replaced by the Hilbert transform of the signal, h(s)=[$h(t_1), \ldots, h(t_K)$], which preserves the timing of power changes without enhancing spectral sensitivity. Thus, for any signal, s, the power rate operator constructs the operator matrix, $H_S$=diag($p_{hh}$), where the components of the vector $p_{hh}$ are the squared Hilbert transform components, $h(t_1) h(t_1)$. The power rate amplitude of the signal s is s•[Hs]=$p_{hh}$•$p_{ss}$, which is the sum of fourth order product and quantifies the rate at which signal power changes in the measurement interval.

A correlation property operator can be useful for separating mixtures of signals from sources with different impulse responses. For a signal, s, the time shift operator-generates an operator matrix, $R_S$, consisting of time shifted vectors of data extracted from the signal. Applying the operator matrix, $R_S$ to the signal generates the signal auto-correlation for the range of time shifts (lags). For source separation, the correlation operator constructs the operator matrix, $C_S$=$R_S R_S^T$, where the restriction to the signal subspace is [$VV^T C_S VV^T$].

Another aspect of the embodiments may be generally related to constructing a separating operator using an artifact signal template. More specifically, often an approximation of the artifact is available for constructing a separating matrix. For example, magneto-encephalographic (MEG) data that corresponds to a mixture of signals from neuronal sources is usually contaminated with artifact signal from the heart. Therefore, the electrocardiogram, c, recorded from the chest is a good artifact signal approximation for constructing the power density operator, $D_c$=diag($p_{cc}$) and using it as a principal separating operator to extract the corresponding heart signal artifact included in the MEG data. Making use of principles 1A and 2A of embodiments of the SSO module:

$$V[V^T D_c V]V^T = V[U_c \lambda_c U_c^T]V^T = V^{(U)} \lambda_c V^{(U)T}$$

where, $V^{(U)}$=$VU_c$ $U_c$ is orthonormal rotation matrix with:

$D_c v_{max}^{(U)}$=$\lambda_{max} v_{max}^{(U)} \Leftrightarrow v_{max}^{(U)}$=(heart) artifact of the data (7)

Artifact separation is successful when the fourth order product between the artifact template and the data artifact is large relative to fourth order products with the signals.

Yet another aspect of the embodiment generally pertains to separation of signals based on maximization signal property amplitude. As previously described, the property operator constructs a unique property operator matrix for each signal, $\{F(s) \rightarrow F_s,\ s\ in\ S\}$. Therefore, the variety of property matrix operators, $F_S$, is only limited by the range of signals that can be constructed using a linear combination of the signal space basis vectors, V. The source separation algorithms of the SSO module are configured to generate the optimum, property operator matrix and extract the corresponding signal that has the greatest property amplitude within a signal subspace spanned by basis vectors, V. Also, the SSO module makes use of the fact that the basis vectors are not unique and can be incrementally rotated until they are aligned with a set of independent signals from sources which are uniquely identified by the specific signal property used for source separation. More particularly, the algorithms embodied in the SSO module construct a sequence of reduced signal subspaces. In each of these subspaces, the amplitude of the signal property is greatest for one signal. Mathematically, each of the two SSO algorithms (described in greater detail below), recursively construct the property operator, $F_S$, for the signal, s, which is the eigenvector corresponding to the maximum eigenvalue, $\lambda_{max}$, of the signal subspace matrix, $[V^T F_S V]$. Therefore, $\lambda_{max}$ is the maximum amplitude of the signal property of any signal in the signal subspace, spanned by basis vectors, V. The SSO algorithm is initialized with any signal subspace vector, v, to construct the property operator matrix, $F_V$. The realization of any of the three property operator previously described, as well as others, in the subspace spanned by V is $$VV^T F_V V V^T = V[V^T F_V V] V^T = V[U_P \lambda_P U_P^T] V^T = V^{(U)} \lambda_P V_{(U)^T}$$

The PCA decomposition of $[V^T F_V V]$ is: $[U_P \lambda_P U_P^T]$ with $F_V V^{(U)} = V^{(U)} \lambda_P$ and $$V^{(U)} = V U_P \quad (8)$$

after expanding terms:

$$V^{(U)T} F_V V^{(U)} = \begin{pmatrix} f_{VV} \cdot p_{11}^{(U)} & 0 & 0 \\ 0 & \ddots & 0 \\ 0 & 0 & f_{VV} \cdot p_{NN}^{(U)} \end{pmatrix} \quad (9)$$

$$= \begin{pmatrix} \lambda_1 & 0 & 0 \\ 0 & \ddots & 0 \\ 0 & 0 & \lambda_N \end{pmatrix}$$

with $\lambda_1 \geq \lambda_2 \geq \ldots \geq \lambda_N$

In Equation 9, the rotated basis vectors, $V^{(U)} = [v_1^{(U)}, \ldots, v_N^{(U)}]$ have corresponding power density vectors, $[p_{11}^{(U)}, \ldots, p_{NN}^{(U)}]$. The components of the vector, $f_{vv}$, are determined by which property operator has been selected. Using the maximum eigenvalue term in Equations 9, a contrast function is constructed:

$$C(v, U) = f_{ss} \cdot p_{11}^{(U)} - \lambda_1 \quad (10)$$

The optimization algorithm minimizes this contrast function by recursively setting $v = v_1^{(U)}$, the principal eigenvector from Equation 9, followed by updating the property operator matrix, $F_V$. However, global convergence on the signal subspace, V, is guaranteed only if:

$$f_{ss} \cdot p_{11}^{(U)} \geq f_{vv} \cdot p_{11}^{(U)} = \lambda_1 \quad (11)$$

for all vectors, $v \in V$,

Using the Rayleigh-Ritz Theorem [16], the greatest eigenvalue is:

$$\lambda_1 = v_1^{(U)T} F_S v_1^{(U)} = \max(v^T F_S v) \quad (12)$$

for any signal subspace vector, v, $v \cdot v = 1$ therefore $$f_{VV} \cdot p_{11}^{(U)} = v_1^{(U)T} F_V v_1^{(U)} = \lambda_1 \geq v^T F_V v \text{ with } v \in V \quad (13)$$

Equation 13 is necessary but not-sufficient to ensure convergence to a global maximum of the algorithm for all operators, $F_V$. However, Equation 11 holds for the power density operator, $D_V = \text{diag}(p_{VV})$ where $\lambda_1 = p_{vv} \cdot p_{11}$.

THEOREM 1: For the power density operator, $D_V = \text{diag}(p_{vv})$, the maximum eigenvalue in Equation 9, $\lambda_1$ is a global maximum only if $v = v_1^{(U)}$, where $v_1^{(U)}$ is the principal eigenvector corresponding to the greatest eigenvalue of the symmetric matrix $V^{(U)T} D_V V^{(U)}$

PROOF:

$$p_{vv} \cdot p_{11}^{(U)} = |p_{vv}| |p_{11}^{(U)}| \cos(\theta),\ \cos(\theta) \leq 1 \quad (14)$$

with $p_{ff} = p_{vv}$ in Equation 13 and $\theta$ = angle between $p_{vv}$ and $p_{11}^{(U)}$:

$$p_{11}^{(U)} \cdot p_{11}^{(U)} \geq |p_{vv}| |p_{11}^{(U)}| \cos(\theta) \geq p_{vv} \cdot p_{vv} = \lambda_1 \quad (15)$$

Equation 15 is identical to Equation 11 with $v_1^{(U)}$ equal to the signal, s, having the greatest power density amplitude, $\lambda_1$.

In some embodiments, a recursive algorithm for minimizing the contrast function (Equation 10) is:
1. Initialize with a singular value decomposition of the data. Retain the signal subspace vectors, V, and set, $v = v_1$, the principal eigenvector.
2. Perform a PCA decomposition of the property operator, $V^T F V = U_p \lambda_p U_p^T$, and construct rotated signal subspace basis vectors, $V^{(U)} = V U_p$, (Equation 8)
3. Set v equal to the principal eigenvector, $v_1^{(U)}$
4. Repeat steps 2-3 until $v = v_1^{(U)}$, (a signal estimate). Equality occurs when the rotation matrix, $U_p$, is equal to an Identity matrix, I, (diagonal elements of $U_p$ differ from 1.0 by some small tolerance, such as 0.00001).
5. Remove the signal component, $v_1^{(U)}$ from the subspace basis vectors, $V^{(U)}$, and repeat steps 2-4 on deflated signal space. Include $v_1^{(U)}$ in the matrix of estimated signals, S.
6. Repeat steps 2-5 until all signals are extracted. They will be in order of their property amplitudes.

Theorem 1 guarantees algorithm convergence for the power density operator, $D_V$, in each deflated subspace to a global maximum. When the principal eigenvalue has a multiplicity greater than one, the other maximal vectors are recovered from the sequence of deflated source subspaces. Second order independence is not altered between the extracted components because the algorithm only performs orthonormal transformations of deflated subspace vectors. Unlike statistical ICA methods, this technique uses a fundamental property of the underlying sources to separate their signals. As a result, signal can be ordered by their property amplitudes to facilitate differentiating sources from components that are primarily artifact.

The computational cost of the algorithm is determined by the PCA decomposition of step 2. However, this cost is greatly decreased as the signal subspace is deflated to extract additional signal components. Therefore, a more efficient algorithm is obtained by repeating steps 2-3 more often when processing deflated subspaces. Approximate signal components, $V^{(Est)}$, are produced in step 5. These are arranged according to property amplitude rank before setting the vector subspace, $V=V^{(Est)}$ in step 2, above. Steps 2-5 are repeated until $U_p$ approximates an identity matrix for each signal component. The steps of a more efficient algorithm are:

1. Initialize with a singular value decomposition of the data. Retain the signal subspace vectors, V, and construct the property operator, $F=F(v)$, using $v=v_1$, the principal eigenvector.
2. Perform a PCA decomposition of the property operator, $V^T F V = U_p \lambda_p U_p^T$, and construct rotated signal subspace basis vectors, $V^{(U)} = V U_p$, (Equation 7)
3. Set v equal to the principal eigenvector, $v_1^{(U)}$
4. Repeat steps 2-3 once for the complete signal space and $d^2$ times for deflated subspaces. Where, d is the number of deflations that have been performed. [Stop, early if the rotation matrix, $U_p$, is approximately equal to an Identity matrix, I, (within a set tolerance, such as 0.00001). Then $v_1^{(U)}$ is an estimate of a signal, s.]
5. Remove the partially estimated signal component, $v_1^{(U)}$ from subspace basis vectors, $V^{(U)}$, and repeat steps 2-4 on the deflated signal space.
6. Update $V^{(Est)}$ with $v_1^{(U)}$ and repeat steps 2-5 until complete deflation of the signal subspace.
7. Set $V=V^{(Est)}$, with components arranged according to property amplitudes, $[v_j \bullet F v_j$, with $F=F(v_j)]$ then construct the property operator, F, using $v_1$.
8. Perform steps 2-7 until the rotation matrix, $U_p$, is an Identity matrix, I, for each deflated subspace. Then the estimated signal matrix is $S=V^{(Est)}$.

The combination of steps 2-6 maximize the property amplitudes of the components, $v_1^{(u)}$, for the complete nested sequence of deflated signal subspaces. The rearrangement in step 7, assures that the signals are optimized in the proper deflated signal subspace. In addition to mathematical efficiency, this algorithm minimizes any recursive computational errors that might stack up when components are extracted one by one. The total computational time is not completely determined by the size of the data and the number of components that are extracted. Rather, computational time also depends on the number of times that steps 2-7 are repeated. The number of times these steps are repeated depends on the tolerance parameter used to determine if the rotation matrices, $U_p = I$, for each extracted signal.

FIG. 1 illustrates a block diagram of an exemplary system 100 where an embodiment may be practiced. It should be readily apparent to those of ordinary skill in the art that the system 100 depicted in FIG. 1 represents a generalized schematic illustration and that other steps may be added or existing components may be removed or modified. Moreover, the system 100 may be implemented using software components, hardware components, or combinations thereof.

As shown in FIG. 1, the system 100 may include a data set 105 as input to a signal space operator ("SSO") processor 110 that outputs separated signals 115a-n. The data set 105 may include data from activities such as medical imaging, radar, sonar, oil exploration data, gas exploration data and mineral exploration, radio telescopes, radio frequency communication, etc. The data set may be presented as multiple signals in a time dependent, time independent and/or combinations thereof.

The SSO processor 110 may be configured to separate the signals from the signal mixture by using a separating operator based on a target signal approximation as described previously and in greater detail below. The SSO processor 110 may be implemented using a personal computer, a workstation, a server, a mainframe or other similar computing device. The output of the SSO processor 110 is the separated signals 115a-n ordered by their fourth order product amplitudes.

Figure 2:
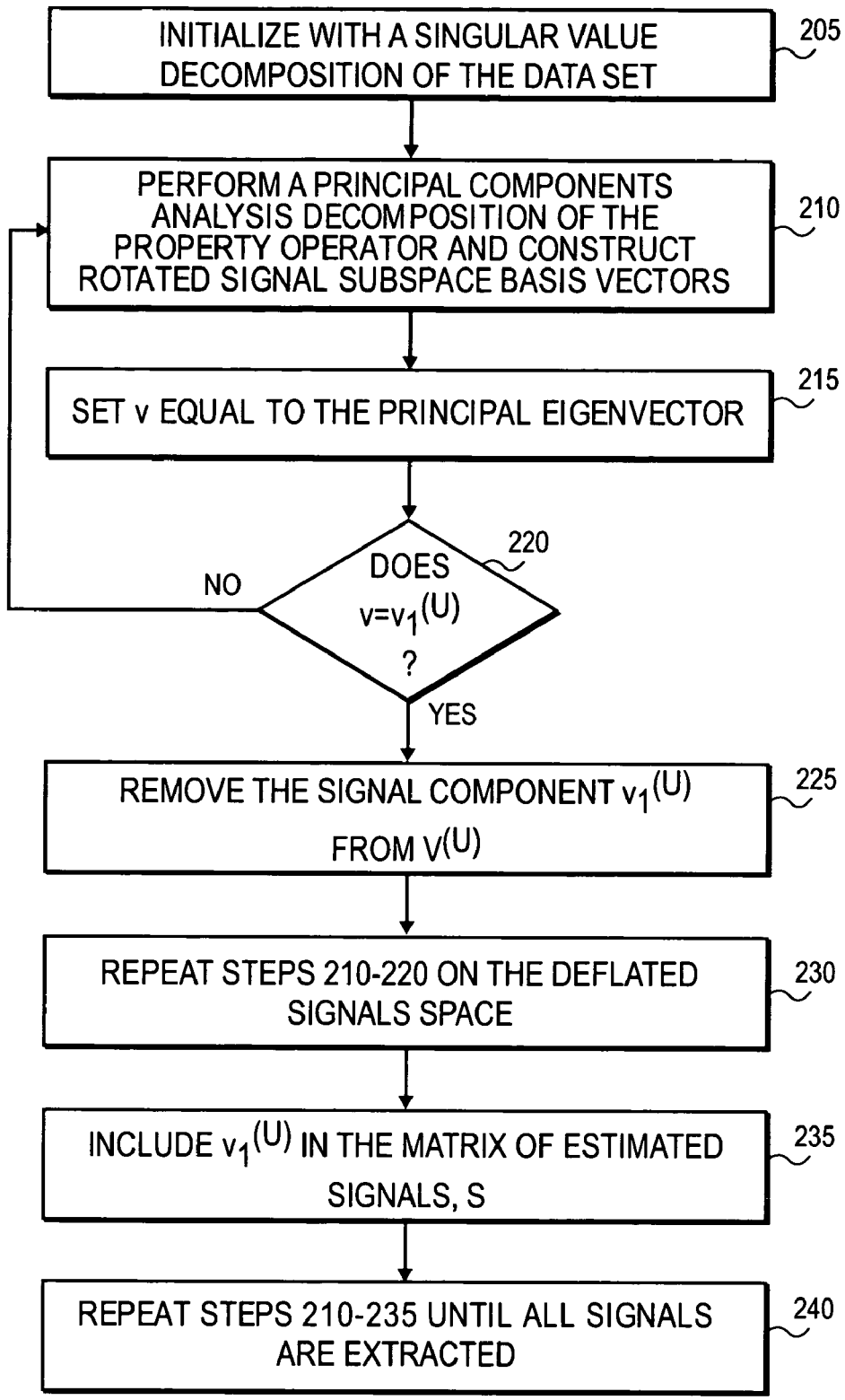
FIG. 2 illustrates a flow diagram implemented by another embodiment.

FIG. 2 illustrates a block diagram of an exemplary flow diagram 200 where an embodiment may be practiced. It should be readily apparent to those of ordinary skill in the art that the flow diagram 200 depicted in FIG. 2 represents a generalized schematic illustration and that other steps may be added or existing steps may be removed or modified. Moreover, the flow diagram 200 may be implemented using software components, hardware components, or combinations thereof.

In some embodiments, the functionality embodied in FIG. 2 may be implemented as a computer program application operating on a computing platform such as a personal computer, workstation, mainframe, or other similar computing device. Accordingly, the SSO processor 110 may be configured to initialize flow diagram 200 by performing a singular value decomposition of a data set, in step 205. The data set may come from a variety of areas such as medical imaging data, radar, sonar, oil exploration data, gas exploration data and mineral exploration, radio telescopes, etc. The data set may include multiple signal mixtures, where the signals may be time dependent, time independent or combinations thereof.

In step 210, the SSO processor 110 may be configured to perform a principal components analysis ("PCA") decomposition of the property operator matrix, $V^T F_V V = U_p \lambda U_p^T$ and construct a rotated signal subspace basis vectors, $V^{(U)} = V U_p$, (Equation 8). The SSO processor 110 may also store the signal subspace vectors, V, and set $v=v_1$, the principal eigenvector.

In step 215, the SSO processor 110 may be configured to set v to the principal eigenvector, $v_1^{(U)}$. Subsequently, the SSO processor 110 may determine whether or not the $v=v_1^{(U)}$, in step 220. If $v=v_1^{(U)}$ are not equivalent, the SSO processor 110 may return to step 210. In some embodiments, an equality condition may exist when the rotation matrix, $U_p$, is equal to an identity matrix, I, (diagonal elements of $U_p$ differ from 1.0 by some small tolerance, such as 0.00001).

Otherwise, if $v=v_1^{(U)}$ are equivalent, the SSO processor 110 may be configured to extract a signal component $v_1^{(U)}$ from the subspace basis vectors, $V^{(U)}$, in step 225. The remaining subspace basis vectors become a deflated signal subspace. The removed signal component, $v_1^{(U)}$, may be included in the matrix of estimated signals, S. Subsequently, the SSO processor 110 may be configured to repeat steps 210-225.

In step 240, the SSO processor 110 may be configured to repeat steps 210-235 until all the signals are extracted as a completed matrix of estimated signals, S. The signals, $s_n$, may be ordered according to their fourth order product amplitudes.

Figure 3A:
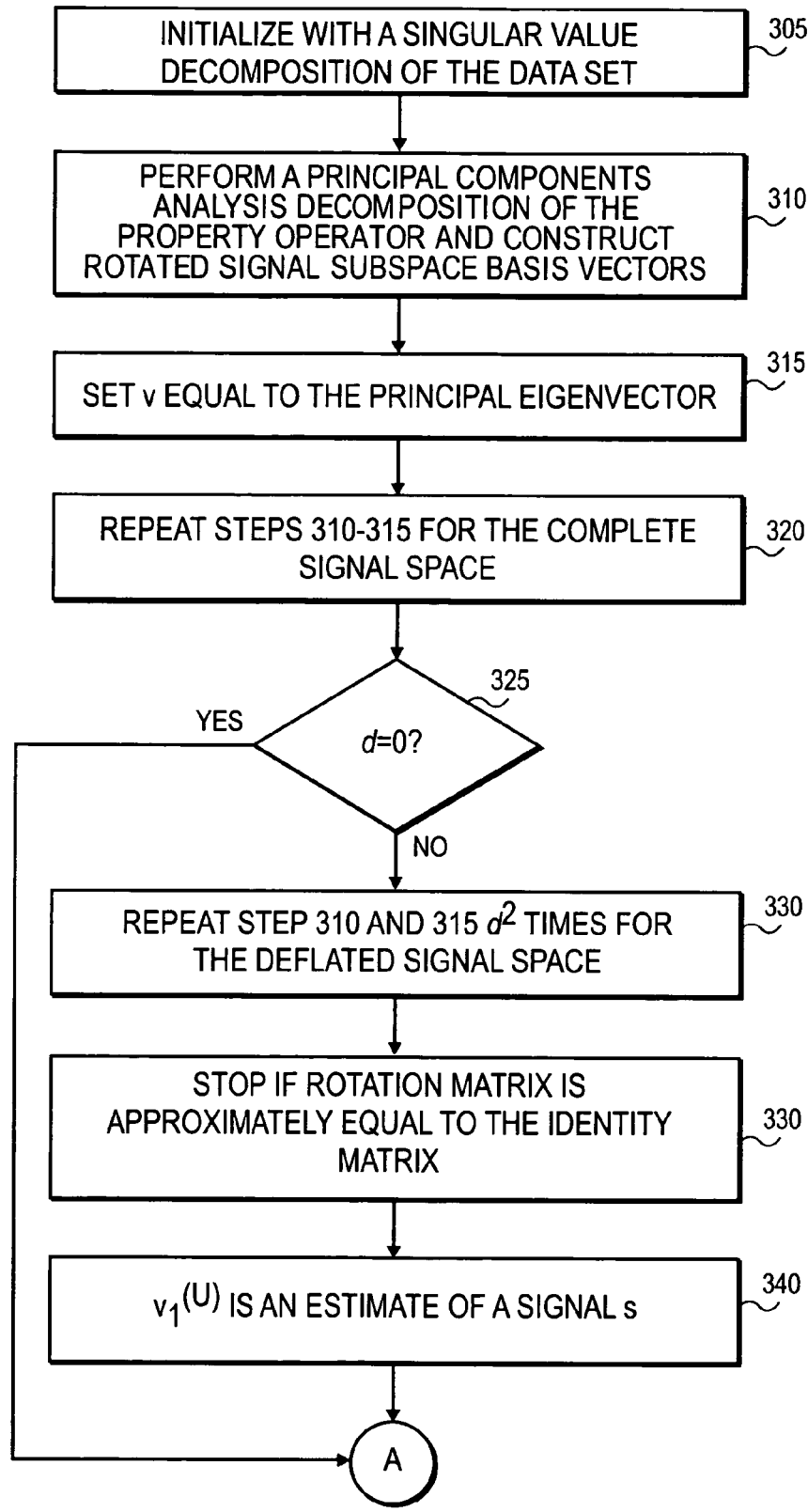
FIGS. 3AB illustrates a flow diagram implemented by yet another embodiment.

FIGS. 3AB illustrate a block diagram of an exemplary flow diagram 300 where an embodiment may be practiced. It should be readily apparent to those of ordinary skill in the art that the flow diagram 300 depicted in FIGS. 3AB represents a generalized schematic illustration and that other steps may be added or existing steps may be removed or modified.

Moreover, the flow diagram 300 may be implemented using software components, hardware components, or combinations thereof.

In some embodiments, the functionality embodied in FIGS. 3AB may be implemented as a computer program application operating on a computing platform such as a personal computer, workstation, mainframe, or other similar computing device. Accordingly, the signal space operator ("SSO") processor 110 may be configured to initialize flow diagram 300 by performing a singular value decomposition of a data set, in step 305. The data set may come from a variety of areas such as medical imaging data, radar, sonar, oil exploration data, gas exploration data and mineral exploration, radio telescopes, etc. The data set may include multiple signal mixtures, where the signals may be time dependent, time independent or combinations thereof. The SSO processor 110 may also be configured to store the signal subspace vectors, V and construct a property operator matrix, $F_V$, using $v_1$, the principal eigenvector.

In step 310, the SSO processor 110 may be configured to perform a principal components analysis ("PCA") decomposition of the property operator matrix, $V^T F_V V = U_p \lambda_p U_p^T$ and construct a rotated signal subspace basis vectors, $V^{(U)} = V U_p$, (Equation 8).

In step 315, the SSO processor 110 may be configured to set v to the principal eigenvector, $v_1^{(U)}$. In step 320, the SSO processor 110 may be configured to repeat steps 310-315 for the complete signal space.

In step 225, the SSO processor may determine whether the number of deflations that have been performed, d, is equal to zero. If the d is set to zero, the SSO processor may proceed to the processing of step 245 (shown in FIG. 3B). Otherwise, if d is greater than zero, the SSO processor 110 may be configured to repeat steps 310-315 $d^2$ times, in step 230. In step 235, the repetition of may be stopped if the rotation matrix, $U_p$, is approximately equal to an Identity matrix, I. In some embodiments, equivalence may be established within a small tolerance, for example, 0.00001. In step 240, either by the end of $d^2$ or equivalence, the SSO processor 110 may set $v_1^{(U)}$ as a partial estimate for a signal, s.

Figure 3B:
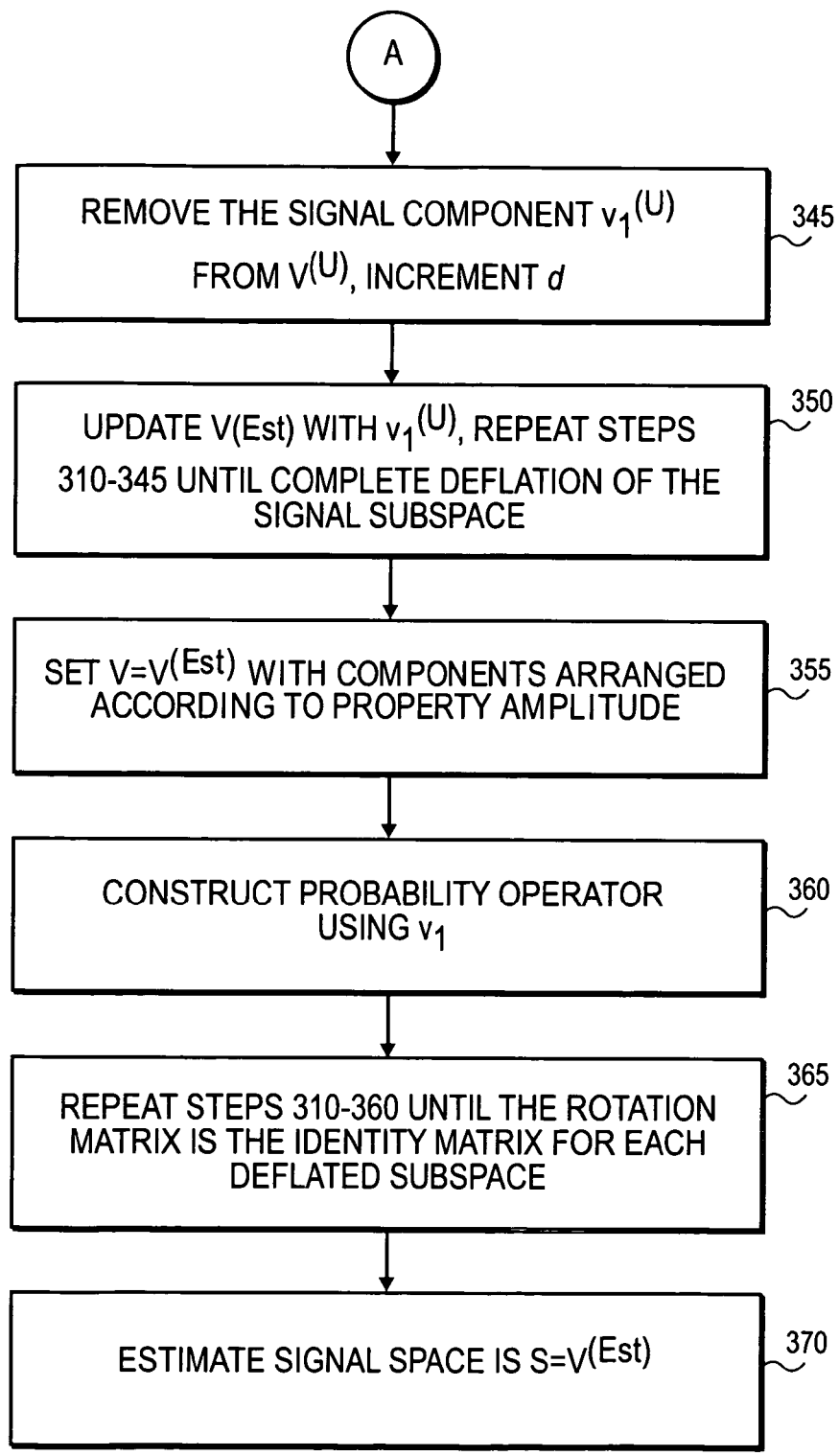

Referring to FIG. 3B, in step 345, the SSO processor 110 may be configured to remove the partially estimated signal component, $v_1^{(U)}$, from the subspace basis vectors, $V^{(U)}$ and repeat steps 310-340 on the deflated signal space and increment d.

In step 350, the SSO processor 110 may be configured to update $V^{(Est)}$ with $v_1^{(U)}$ and repeat steps 310-345 until a complete deflation of the signal space. In step 355, the SSO processor 110 may be configured to set $V = V^{(Est)}$, with components arranged according to fourth order product amplitude.

In step 360, the SSO processor 110 may be configured to construct a probability operator, $F_V$ using $v_1$, which has the largest property amplitude. In step 365, the SSO processor 110 may be configured to repeats steps 310-360 until the rotation matrix, $U_p$, is approximately equal to an Identity matrix, I, for each deflated subspace. Accordingly, in step 370, the SSO processor 110 may produce an estimated signal space as $S = V^{(Est)}$.

Figure 4:
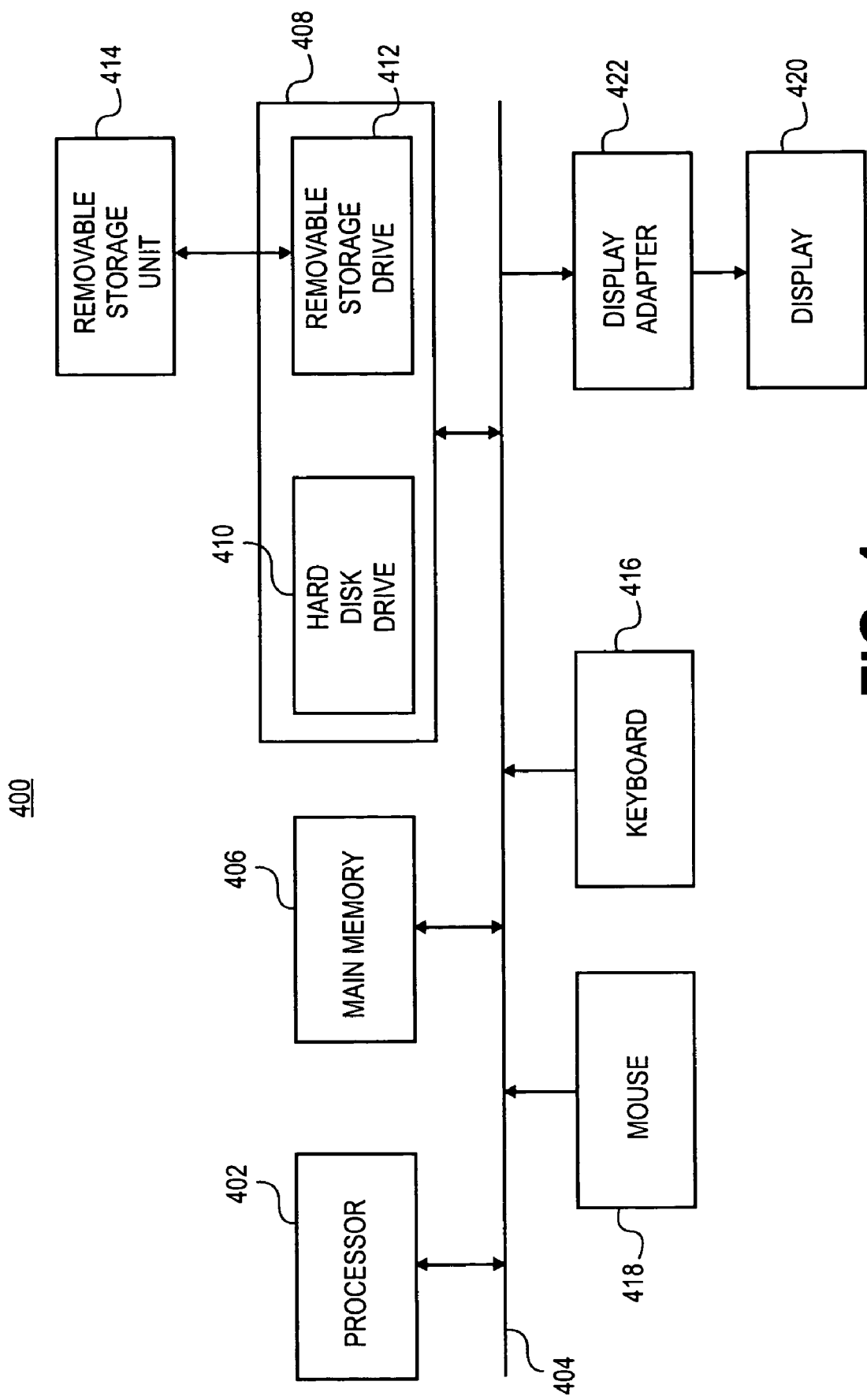
FIG. 4 illustrates an exemplary block diagram of a computing platform where an embodiment may be practiced.

FIG. 4 illustrates an exemplary block diagram of a computing platform 400 where an embodiment may be practiced. The functions of the SSO processor 110 may be implemented in program code and executed by the computing platform 400. The visual enhancement module may be implemented in computer languages such as PASCAL, C, C++, JAVA, etc.

As shown in FIG. 4, the computer system 400 includes one or more processors, such as processor 402 that provide an execution platform for embodiments of the SSO processor. Commands and data from the processor 402 are communicated over a communication bus 404. The computer system 400 also includes a main memory 406, such as a Random Access Memory (RAM), where the software for the RPS may be executed during runtime, and a secondary memory 408. The secondary memory 408 includes, for example, a hard disk drive 420 and/or a removable storage drive 422, representing a floppy diskette drive, a magnetic tape drive, a compact disk drive, etc., where a copy of a computer program embodiment for the SSO processor may be stored. The removable storage drive 422 reads from and/or writes to a removable storage unit 424 in a well-known manner. A user interfaces with the SSO processor with a keyboard 426, a mouse 428, and a display 420. The display adaptor 422 interfaces with the communication bus 404 and the display 420 and receives display data from the processor 402 and converts the display data into display commands for the display 420.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of signal separation and discrimination, the method comprising:
   receiving a plurality of signal mixtures at a processor, each signal having a property whose value is based on a principal eigenvalue;
   creating a signal separating operator, $F_s$ using a target signal approximation $s_a$;
   applying the signal separating operator to the plurality of signal mixtures; and
   obtaining the target signal s from the plurality of signal mixtures based on the application of the signal separating operator on the plurality of signal mixtures.

2. The method of claim 1, wherein the applying the signal separating operator, further comprises:
step a. performing a singular value decomposition of the plurality of signal mixtures;
step b. storing a plurality of signal subspace vectors based on the singular decomposition of the plurality of signal mixtures as a matrix V; and
step c. obtaining the principal eigenvector of the signal separating operator restricted to a signal subspace spanned by a plurality of signal subspace vectors determined from the plurality of signals.

3. The method of claim 2, further comprising:
step d. updating the signal vector, s, with the principal eigenvector of the basis matrix, $V^{(U)}$, wherein $V^{(U)}=VU_s$ and $U_s$ is based on a principal component decomposition, $U_s\lambda(s)U_s^T$ of $V^T F_s V$ such that $V^{(U)\lambda\ V^{(U)T}}=VU_s\lambda U_s^T V^T = V V^T F_s V V^T$, is the principal component decomposition of the restriction of the signal separating operator to the signal space of the plurality of signal mixtures where $V V^T$ is a signal space projection operator.

4. The method of claim 3, further comprising:
step e. updating the matrix V with rotated signal subspace basis vectors, $V^{(U)}=VU_s$ and updating the property operator with the property operator corresponding to the principal eigenvector of $V^{(U)}$; and
step f. repeating steps d-e until an equality condition is achieved.

5. The method of claim 4, wherein the equality condition is a rotation matrix, $U_s$, approximately equal to an identity matrix.

6. The method of claim 4, further comprising:
step g. creating a deflated signal subspace by removing, $s_{max}$, from the rotated subspace basis vectors; and
step h. repeating steps d-g until all signals have been sequentially removed from the deflated signal subspace basis vectors and placed in a signal matrix, S, arranged by signal property amplitude.

7. The method according to claim 3, further comprising:
step e. updating the matrix V with rotated signal subspace basis vectors, $V^{(U)}=VU_s$ and updating the property operator with the property operator corresponding to the principal eigenvector of $V^{(U)}$;
step f. repeating steps d-e N times, wherein N is determined by the number of removals of the partial signal estimates in step i;
step g. removing a partial signal estimate of $s_{max}$, from the rotated subspace basis vectors;
step h. repeating steps d-g until all partial signal estimates of $s_{max}$ have been sequentially removed from the deflated signal subspace basis vectors and placed in a signal matrix, $V^{(est)}$, arranged by signal property amplitude; and
step i. updating the signal basis spanning vectors, V, with the partial signal estimate vectors, $V^{(est)}$.

8. The method according to claim 7, further comprising:
step j. repeating steps d-i until all the partial signal estimates included in the matrix, $V^{(est)}$, are approximately equal to the prior partial signal estimates of, $V^{(est)}$, obtained before repeating steps d-i; and
step k. setting signal estimates S equal to the partial signal estimates of the matrix, $V^{(est)}$, arranged by signal property amplitude.

9. The method of claim 1, wherein the plurality of signal mixtures is associated with electromagnetic signals.

10. The method of claim 1, wherein the plurality of signal mixtures is associated with non-electromagnetic signals.

11. The method of claim 1, wherein the plurality of signal mixtures is associated with brain functions.

12. The method of claim 1, wherein the plurality of signal mixtures is time-dependent.

13. The method of claim 1, wherein the plurality of signal mixtures is time-independent.

14. The method of claim 1, wherein the method is applied to one of the following types of signal discrimination problems, including blind separation of signals, encryption, artifact separation of signals, separation of burst signals, or noise filtering.

15. A computer storage device embedded with one or more computer programs, said one or more computer programs implementing a method of signal discrimination, said one or more computer programs comprising a set of instructions for:
receiving a plurality of signal mixtures, each signal having a property whose value is based on a principal eigenvalue;
creating a signal separating operator using a target signal approximation;
applying the signal separating operator to the plurality of signal mixtures; and
obtaining a target signal from the plurality of signal mixtures based on the application of the signal separating operator on the plurality of signal mixtures.

16. The computer storage device of claim 15, wherein the embedded one or more computer programs is executed to solve one of the following types of signal discrimination problems, including blind separation of signals, encryption, artifact separation of signals, separation of burst signals, or noise filtering.

17. The computer storage device according to claim 15, wherein said set of instructions further comprises:
performing a singular value decomposition of the plurality of signal mixtures;
storing a plurality of signal subspace vectors based on the singular decomposition of the plurality of signal mixtures as a matrix V; and
obtaining the principal eigenvector of the signal separating operator restricted to a signal subspace spanned by a plurality of signal subspace vectors determined from the plurality of signals.

18. The computer storage device according to claim 17, wherein said set of instructions further comprises:
updating the signal vector, s, with the principal eigenvector of the basis matrix, $V^{(U)}$, wherein $V^{(U)}=VU_s$ and $U_s$ is based on a principal component decomposition, $U_s\lambda(s) U_s^T$ of $V^T F_s V$ such that $V^{(U)}\lambda V^{(U)T}=VU_{s\lambda Us}^T V^T=V V^T F_s V V^T$, is the principal component decomposition of the restriction of the signal separating operator to the signal space of the plurality of signal mixtures where $V V^T$ is a signal space projection operator.

19. The computer storage device according to claim 18, wherein said set of instructions further comprises:
updating the matrix V with rotated signal subspace basis vectors, $V^{(U)}=VU_s$ and updating property operator $F_s$ with the property operator corresponding to the principal eigenvector of $V^{(U)}$; and
repeating the updating steps until an equality condition is achieved.

20. The computer storage device according to claim 19, wherein the equality condition is a rotation matrix, $U_s$, and is approximately equal to an identity matrix.

21. The computer storage device according to claim 19, wherein said set of instructions further comprises:
creating a deflated signal subspace by removing $s_{max}$, from the rotated subspace basis vectors; and repeating the updating, repeating, and creating steps until all signals have been sequentially removed from the deflated signal subspace basis vectors and placed in a signal matrix, S, arranged by signal property amplitude.

22. The computer storage device according to claim 18, wherein said set of instructions further comprises:

updating the matrix V with rotated signal subspace basis vectors, $V^{(U)}=VU_s$ and updating property operator $F_s$ with the property operator corresponding to the principal eigenvector of $V^{(U)}$;

repeating the updating steps N times, wherein N is determined by the number of removals of the plurality of signals in the following updating step;

removing a partial estimate of $s_{max}$, from the rotated subspace basis vectors;

repeating the updating, repeating, and removing steps until all partial signal estimates of $s_{max}$ have been removed from the deflated signal subspace basis vectors and placed in a signal matrix, $V^{(est)}$, arranged by signal property amplitude; and updating the signal basis spanning vectors, V, with the partial signal estimate vectors, $V^{(est)}$.

23. The computer storage device according to claim 22, wherein said set of instructions further comprises:

repeating the updating, repeating, removing, and updating steps until all the partial signal estimates included in the matrix, $V^{(est)}$, are approximately equal to the prior partial signal estimates of $V^{(est)}$, obtained before repeating the updating, repeating, removing, and updating steps; and setting the partial signal estimates equal to the partial signal estimates of the matrix, $V^{(est)}$, arranged by signal property amplitude.

24. A method of signal separation and discrimination, the method comprising:

receiving a plurality of signal mixtures at a processor, each signal having a property whose value is based on a principal eigenvalue;

creating a signal separating operator using a target signal property;

applying the signal separating operator to the plurality of signal mixtures; and obtaining a target signal from the plurality of signal mixtures based on the application of the signal separating operator on the plurality of signal mixtures.

25. The method of claim 24, further comprising:

recursively optimizing a property operator until property operator is equal to the signal separating operator and configured to determine the target signal, s, wherein, the property amplitude of the target signal s is greater than all other signals in the signal space spanned by the matrix, V.

26. The method of claim 24, wherein the method is applied to one of the following types of signal discrimination problems, including blind separation of signals, encryption, artifact separation of signals, separation of burst signals, or noise filtering.

27. A computer storage device embedded with one or more computer programs, said one or more computer programs implementing a method of signal discrimination, said one or more computer programs comprising a set of instructions for:

receiving a plurality of signal mixtures, each signal having a property whose value is based on a principal eigenvalue;

creating a signal separating operator using a target signal property;

applying the signal separating operator to the plurality of signal mixtures; and obtaining a target signal from the plurality of signal mixtures based on the application of the signal separating operator on the plurality of signal mixtures.

28. The computer storage device according to claim 27, wherein said set of instructions further comprises:

recursively optimizing a signal property operator, $F_s$, until $F_s$ is equal to the signal separating operator and configured to determine the target signal, s, wherein, the property amplitude of the target signal is greater than all other signals in the signal space spanned by the matrix, V.

29. The computer storage device of claim 27, wherein the embedded one or more computer programs is executed to solve one of the following types of signal discrimination problems, including blind separation of signals, encryption, artifact separation of signals, separation of burst signals, or noise filtering.

* * * * *